US006894457B2

(12) United States Patent
Germagian et al.

(10) Patent No.: US 6,894,457 B2
(45) Date of Patent: May 17, 2005

(54) UNIVERSAL MULTIPLE DEVICE POWER ADAPTER AND CARRY CASE

(75) Inventors: Mark H. Germagian, Hudson, MA (US); Matthew F. Bush, Chelmsford, MA (US); Jane Morgan, Narragansett, RI (US)

(73) Assignee: American Power Conversion Corporation, West Kingston, RI (US)

( * ) Notice: Subject to any disclaimer, the term of this patent is extended or adjusted under 35 U.S.C. 154(b) by 113 days.

(21) Appl. No.: 10/285,822

(22) Filed: Nov. 1, 2002

(65) Prior Publication Data

US 2004/0085043 A1 May 6, 2004

(51) Int. Cl.⁷ .................. H01M 10/44; H01M 10/46
(52) U.S. Cl. .................. 320/119; 363/146
(58) Field of Search ................. 320/116, 119, 320/137, 138, 114; 363/146

(56) References Cited

U.S. PATENT DOCUMENTS

| | | | | |
|---|---|---|---|---|
| 3,792,796 A | * | 2/1974 | Woodruff et al. | 220/495 |
| 5,094,635 A | * | 3/1992 | Thompson et al. | 439/755 |
| 5,212,628 A | * | 5/1993 | Bradbury | 361/683 |
| 5,220,269 A | | 6/1993 | Chen et al. | 320/2 |
| 6,177,785 B1 | | 1/2001 | Lee | 323/281 |
| 6,434,032 B1 | | 8/2002 | Romano | 363/146 |
| 2002/0154520 A1 | | 10/2002 | Mercier | 363/21.07 |

FOREIGN PATENT DOCUMENTS

| | | |
|---|---|---|
| EP | 1 221 745 A1 | 7/2002 |
| GB | 718003 | 11/1954 |
| WO | WO 99/12244 | 3/1999 |

OTHER PUBLICATIONS

Patent Abstracts of Japan, vol. 2000, No. 24, May 11, 2001 & JP 2001 202163 A, Funai Electric Co. Ltd (Jul. 27, 2001), Abstract only.
International Search Report for PCT/US03/34830, mailing date: May 4, 2004.

* cited by examiner

*Primary Examiner*—Edward H. Tso
(74) *Attorney, Agent, or Firm*—Mintz, Levin, Cohn, Ferris, Glovsky and Popeo, P.C.

(57) ABSTRACT

The present invention is directed to a carrying case with an integrated power supply system for providing power to multiple electronic devices from a single power source. In addition to allowing quick access and storage of various electronic devices, the carrying case also allows the individual electronic devices to be easily connected to the power source and eliminates the need to carry multiple charging cords. In certain embodiments, the power supply system further includes an additional battery or other power source, which increases the runtime of connected electronic devices and reduces the need to carry additional individual batteries for the individual devices. With different connectors on the input to the power system, different AC or DC power sources may be utilized. Different connectors can also be used to provide power to different electronic devices.

21 Claims, 4 Drawing Sheets

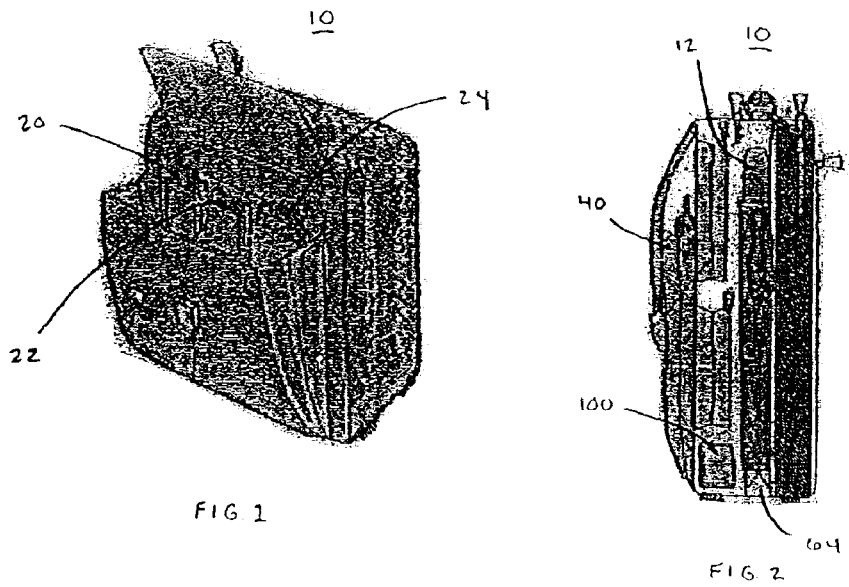
FIG. 1
FIG. 2
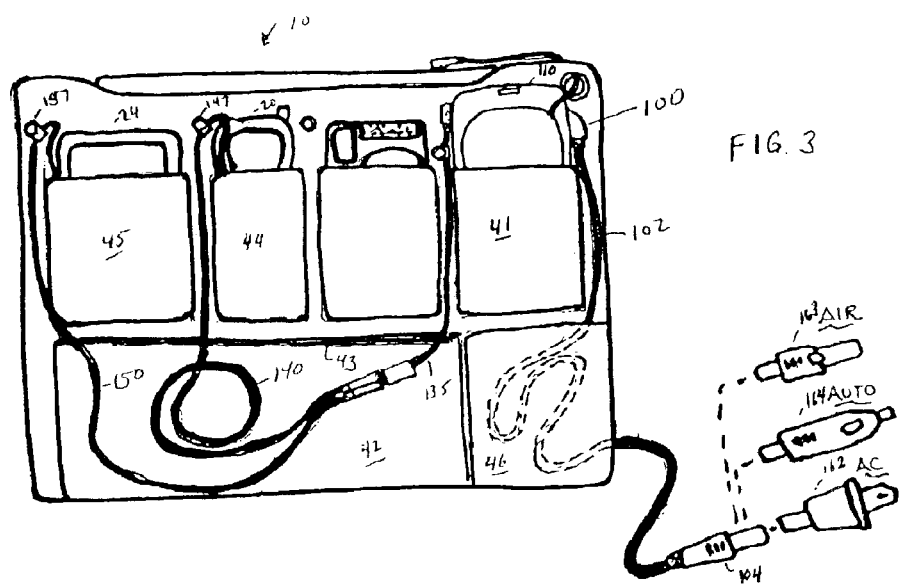
FIG. 3

UNIVERSAL MULTIPLE DEVICE POWER ADAPTER AND CARRY CASE

BACKGROUND OF THE INVENTION

1. Field of the Invention

The present invention is directed generally to power adapters. More specifically, it relates to a universal power adapter incorporated with a carrying case for supplying power to a computer and multiple other portable electronic devices.

2. Discussion of Related Art

The proliferation of portable and laptop computers has greatly expanded the need for consistent, reliable power sources. A laptop computer is limited by the power available from the internal batteries. When the batteries become discharged, a source of power is needed to recharge them. Typically, a laptop computer includes a power adapter for connecting the laptop computer to a power utility outlet for recharging the batteries and powering the computer. However, there are no standards for power adapters or laptop computers. Different brands of laptop computers require different power levels. Thus, power adapters are not interchangeable and can only be used with a specific brand or model computer. If a power adapter is lost or malfunctions, it cannot be easily replaced. Therefore, a need exists for a power adapter which can provide different voltage levels for use with different computers.

Furthermore, often travelers, who regularly use laptop computers, do not have access to a power utility outlet, such as when they are on an airplane or in a car. However, such locations have different types of power sources. Airlines have begun installing power connectors for providing DC power for passenger equipment. Automobiles have "cigarette lighters" or similarly designed power jacks which provide 12 volt DC power from the automobile battery. Regular laptop power adapters cannot utilize these power sources. Additionally, international travelers encounter utility power connectors which differ from those in the United States. For example, utility power in Europe is 220 volts compared to 110 volts in the United States. The power connections are also different. While computer manufacturers produce power adapters for a variety power sources including automobiles, airplanes and international sources, these power adapters have to be purchased separately. A traveler often has to carry a variety of power adapters to be utilized in different situations. Therefore, a need exists for a power adapter which can be used with different power sources.

While several different universal power adapters have been developed which operate with different power sources or which provide different power outputs, such devices provide a single power output. In addition to laptop computers, the number of other portable electronic devices has been expanding. People regularly carry cellular telephones and personal digital assistants (PDA's). Wireless email devices, MP3 players, digital cameras, and gaming devices have also become common. While many of these types of devices operate on batteries, they need to be regularly recharged. As with laptop computers, these devices generally have a power adapter for connecting the device to a utility power outlet for recharging. Of course, each device has its own power requirements which necessitates a specific power adapter. A person with multiple electronic devices requires multiple power adapters. Even if a power outlet is available, it only provides two connectors and cannot provide power to more than two electronic devices. Therefore, in order to recharge multiple devices, a multiple plug splitter is required in addition to the individual power adapters for each of the devices. Therefore, a need exists for a power adapter which can provide multiple power outputs for power to multiple devices.

With all of the electronic devices and power adapters which people regularly carry, a need exists for a carrying case to accommodate these devices. There are several types of prior art carrying cases for protecting and transporting portable computers. In addition to being designed for housing portable computers, many of these cases also provide compartments for storing additional electronic devices. However, the separate power adapters for each of the electronic devices need to be included in the case, which takes up substantial space and adds to the weight. As the need and desire to carry more portable electronic devices increases, the dimensions of a carrying case that is capable of accommodating them, as well as their power cords, must also increase.

In some prior art cases, integrated power systems for distributing power to multiple electronic devices are provided in the carrying case. These and other prior art cases allow a user to provided power several electronic devices from a single AC power source. Typically, however, these cases still require the user to carry and use the individual power cords that come with the electronic devices. Therefore, these systems often require the user to retrieve, remove and uncoil multiple power cords and then individually attach each electronic device to an internal or external power source. Therefore, a need exists for a simple carrying case and power adapter which accommodates multiple electronic devices and can provide power from multiple input sources.

SUMMARY OF THE INVENTION

The present invention substantially overcomes the deficiencies of the prior art by providing a carrying case having a power system for supplying power to multiple electronic devices operatively connected to the power system through easily accessible power lines accommodated within the case. According to an aspect of the invention, the system allows several electronic devices to be simultaneously powered or charged from a single power source. According to another aspect of the invention, the power system can accommodate different input power sources, including domestic AC, internal and external DC, and international AC power sources. Additionally, a carrying case is provided that allows for easy charging, easy access to and easy operation of multiple portable electronic devices while eliminating the need for separate power cords.

According to another embodiment of the invention, the carrying case includes an auxiliary battery as a power source for the electronic devices. The auxiliary battery may be charged by the power adapter in the carrying case when connected to an external power source. The auxiliary battery can be used as a power source for the power system to provide power to or charge a portable computer or other electronic devices. The use of the auxiliary battery as the power source increases the runtime of the portable computer and other electronic devices, thereby reducing the need to carry additional or backup batteries in the carrying case. Furthermore, the power system and auxiliary battery can provide power to devices without the need to turn off the devices to change batteries.

According to another aspect of the invention, the power adapter of the carrying case has a selectable output. The selectable output allows the user to choose a power level for the output appropriate for the portable computer or other electronic device to be powered or recharged. According to another aspect of the invention, the system includes various power connectors for connecting the power adapter to different types of inputs or different types of outputs. According to another aspect of the invention, the system includes one or more output cables and splitters for providing output power to multiple devices having identical power requirements from a single connector.

According to one aspect, the present invention carrying case includes a power supply system, the power supply system including a power input system for receiving power from a power source and for providing a first DC bus voltage and a second DC bus voltage. According to other aspects of the invention, additional DC bus voltages can be supplied by the power system, and multiple outputs can be provided from each DC bus voltage. The carrying case may be constructed and arranged such that the power input system further includes an AC/DC converter and a power cord for operatively connecting the AC/DC converter to an AC power source. The carrying case may be constructed and arranged such that the power input system further includes a DC/DC converter and a power cord for operatively connecting the DC/DC converter to a DC power source. Alternatively, the system includes a single power cord selectively connected both an AC/DC converter and a DC/DC converter. The carrying case may be constructed and arranged such that the power input system further includes an AC/DC converter, a first power cord for operatively connecting the AC/DC converter to an AC power source, a DC/DC converter and a second power cord for operatively connecting the DC/DC converter to a DC power source.

The carrying case may be constructed and arranged such that the power input system further includes an AC/DC converter, a DC/DC converter and a power cord for operatively connecting either the AC/DC converter to an AC power source or the DC/DC converter to a DC power source. The power cord may be constructed and arranged to include an adapter for operatively connecting a first end of the power cord to either an AC or DC power source. According to another aspect of the invention, a power cord may include multiple wires connected to the AC/DC converter and the DC/DC converter. An input adapter selectively connects to a subset of the multiple wires in order to select the appropriate converter. The power cord may include three wires.

The carrying case may be constructed and arranged to include a plurality of enclosures for accommodating various electronic devices. The carrying case may be constructed and arranged to include wiring passageways to route the outputs from the power supply system to the various enclosures for accommodating the electronic devices. Individual enclosures or passageways may be constructed and arranged in the form of mesh pockets. Loop and hook fasteners, elastic, snaps, loops and other mechanisms can be used to close pockets or to maintain the wires in desired locations within the carry case.

The power supply system of the present invention may be constructed and arranged to be removable from the carrying case such that it can be used separately from the case. The carrying case may be constructed and arranged such that an electronic device can be connected to the power supply while either in or out of the carrying case.

The carrying case may be constructed and arranged such that the power supply system includes a battery module operatively connected to the power input system. The power supply system may be constructed and arranged such that an electronic device connected to the power supply system draws power from the battery module prior to drawing power from an internal battery.

BRIEF DESCRIPTION OF THE DRAWINGS

For a better understanding of the present invention, reference is made to the drawings, which are incorporated herein by reference, and in which:

FIG. 1 is a perspective view of a carrying case in accordance with an embodiment of the present invention;

FIG. 2 is a cross-sectional side view of the carrying case of FIG. 1;

FIG. 3 is a cross-sectional view showing an interior portion of a carrying case in accordance with an embodiment of the present invention;

DETAILED DESCRIPTION

Figure 4:
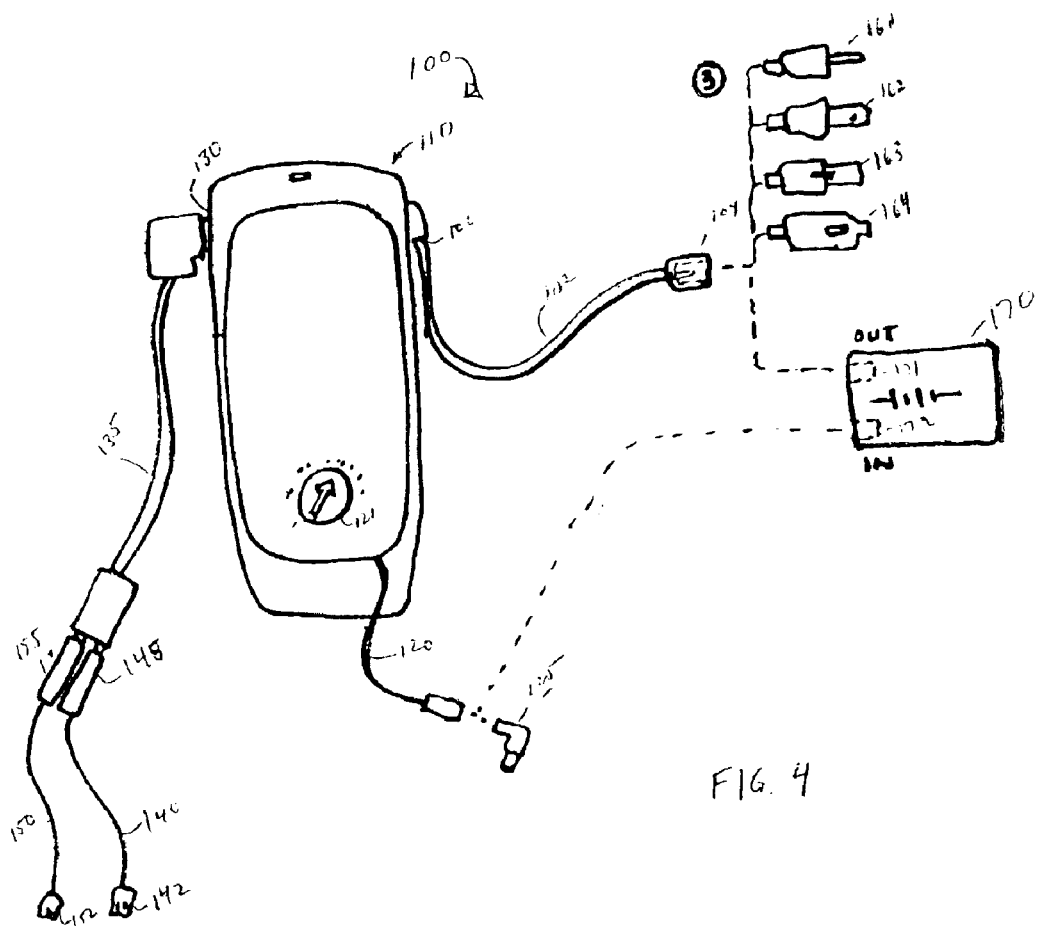
FIG. 4 is a front view of a power supply system in accordance with an embodiment of the present invention.

For purpose of illustration, and not to limit generally, the present invention will now be described with specific reference to a computer carrying case with a power system and wiring for simultaneously providing, from a single power source, power for running and charging a portable computer and or other electronic devices. One skilled in the art will appreciate, however, that embodiments of the present invention are not limited to computer carrying cases and that various embodiments of the disclosed equipment and wiring can be used independently of the disclosed computer carrying case and may be incorporated into a variety of containers.

FIGS. 1–3 show various perspective, side and cross-sectional views of a carrying case 10. The carrying case 10 is structured to securely and efficiently transport a portable computer 12 and various other portable electronic devices, such as a cellular phone 20, a headset 22 and a PDA 24, while allowing quick access thereto and convenient charging thereof. The carrying case 10 may include any number of pockets or compartments, such as compartment 40, for carrying electronic devices or accessories. Those of ordinary skill in the art of carrying case design will readily understand that different configurations or types of pockets or compartments may be used in the carrying case 10. The carrying case 10 may further include a strap (not shown) for securing the computer 12 within an expandable pocket 62. A piece of foam material 64, which is shown placed beneath expandable pocket 62, is used to protect the portable computer 12.

Figure 5:
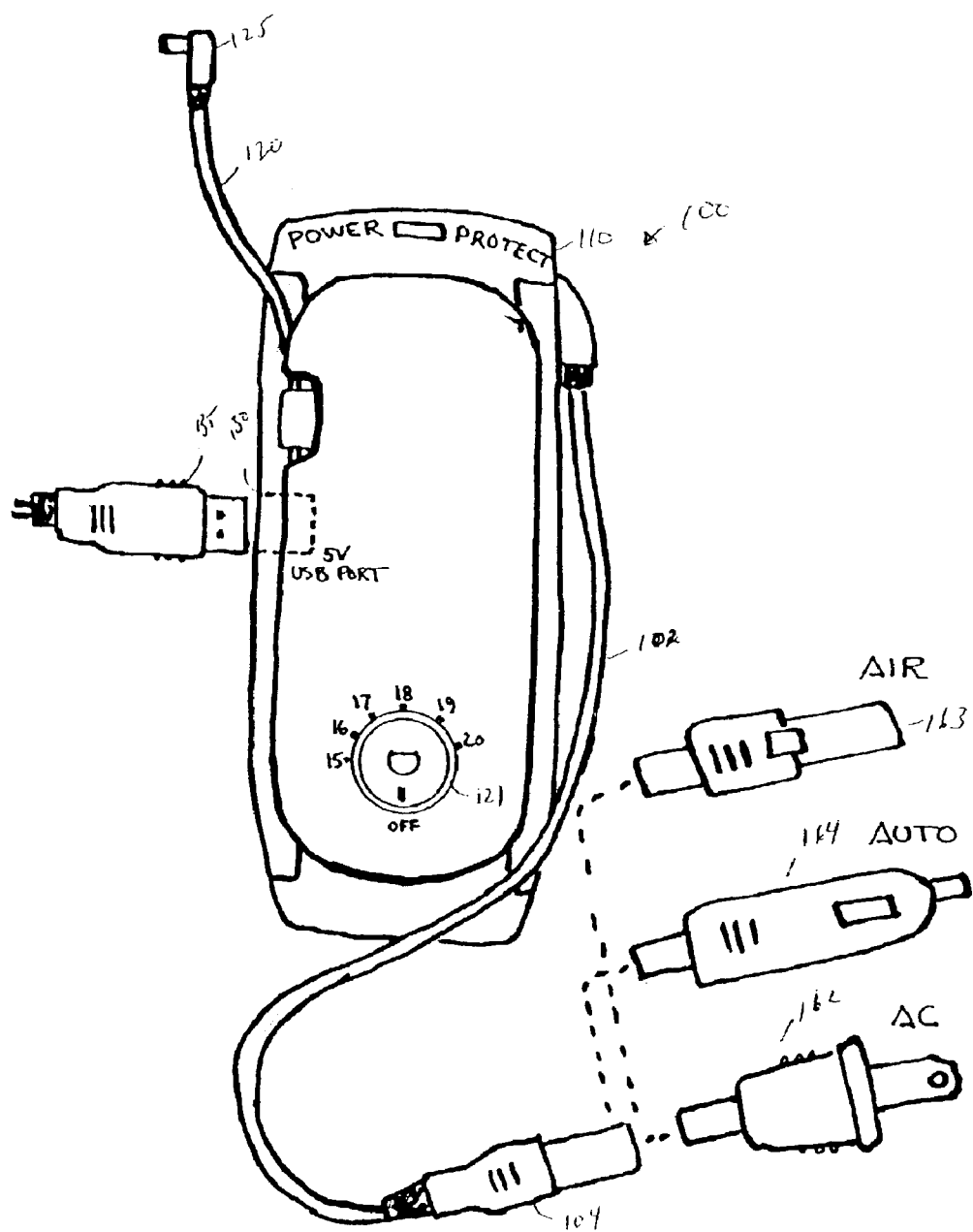
FIG. 5 is a front view of a universal power adapter of the power supply system of FIG. 4.

FIGS. 4 and 5 show a power supply system 100 for integration with carrying case 10. FIG. 2 illustrates the power supply system 100 disposed below the electronic devices in the carrying case 10. FIG. 3 illustrates the power supply system 100 in a pocket 41 adjacent to the electronic devices and wiring in various other pockes. The present invention is not limited to a specific location or arrangement for the power supply system within the carrying case. The power supply system 100 and its corresponding wiring may be accommodated within any part of the carrying case 10 such that the wiring is accessible for attachment to an external power source and for attachment to the electronic devices.

In the present embodiment, the power supply system 100 (illustrated in FIGS. 4–5) includes a power supply cord 102 having a first end 104 for connecting to an external power source (not shown) and a second end 106 for connecting to an power adapter 110. The second end 106 of the power supply cord 102 may be permanently connected to the power adapter 110 or, alternatively, may be detachably connected to an input to the power adapter 110. The power adapter 110 includes a first voltage output 120 which provides a DC output. A selector switch 121 is used to select the output voltage for the first voltage output 120. The selector switch allows the power adapter 110 to be used with portable computers or other equipment which require different voltage levels. As illustrated in FIG. 5, the possible voltage levels may be from 15 to 20 volts DC. These voltages correspond to typical voltages required by portable computers. Of course, other voltages could be provided depending upon the circuitry included in the power adapter 110. A replaceable power connector 125 is connected to the first voltage output 120. Different replaceable power connectors 125 are used for different equipment. Portable computers require different types of power connectors. Accordingly, the present invention accommodates different portable computers through the use of the replaceable power connector 125. Alternatively different output wires can be used as the first voltage output 120 for different portable computers, rather than a single wire with a replaceable power connector 125.

According to the present embodiment of the invention, the power adapter 110 includes a second voltage output 130. The second voltage output 130 is a 5 volt USB port connector. Of course, other voltage levels or types of connectors could also be used. Furthermore, the present invention is not limited to a single second voltage output. Any number of outputs could be included on the power adapter. Different voltage levels can be used for any of the outputs. A USB port is used in the preferred embodiment because certain cellular telephones and other electronic devices can be charged with a USB port. The second voltage output 130 allows connection of additional electronic devices, such as cellular phones and PDAs, to the power adapter 110. As shown in FIG. 4, various wires 135, 140, 150 are used for connecting the electronic devices to the power adapter 110. A splitter 135 connects to the second voltage output 130 of the power adapter 110. The splitter creates two outputs from the single port. Of course, the splitter could create any number of outputs. A device wire 140 includes a connector 145 for attachment to the splitter. In the illustrated embodiment, the connector 145 is a USB port. Thus, the device wire 140 could alternatively be connected directly to the second voltage output 130 of the power adapter 110 if only one additional electronic device were to be powered. A second connector 142 of the device wire is arranged to mate with the input to the electronic device. Different second connectors 142 may be needed for different electronic devices. A second device wire 150 also connects to the splitter 135 for providing power to a second electronic device. The second device wire 150 also has a first connector 155, which is a USB port connector and a second connector 152 for connecting to the second electronic device. Furthermore, the device wires 140, 150 may include an inline DC/DC converter to accommodate devices which require a voltage other than 5 volts for power or charging.

Figure 7:
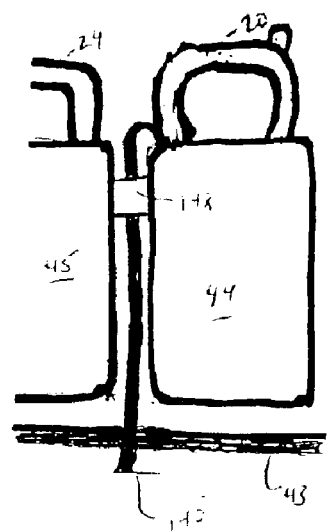
FIG. 7 is a front view of a wire holding structure.
Figure 4:
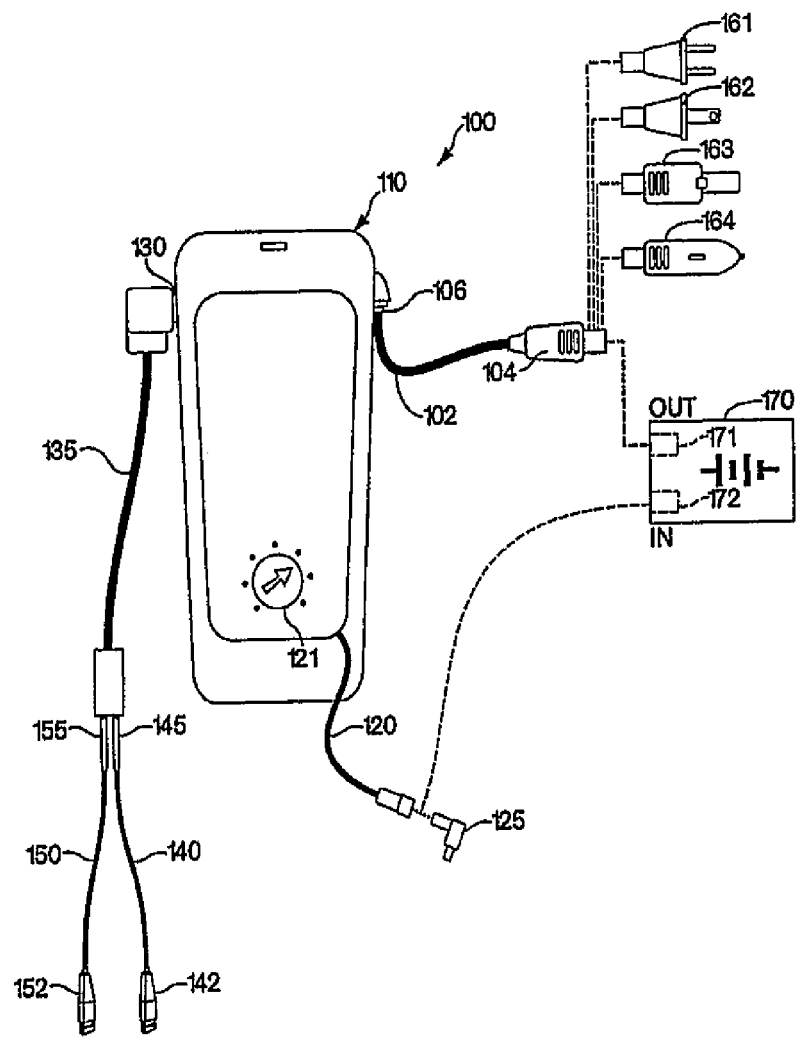
Figure 5:
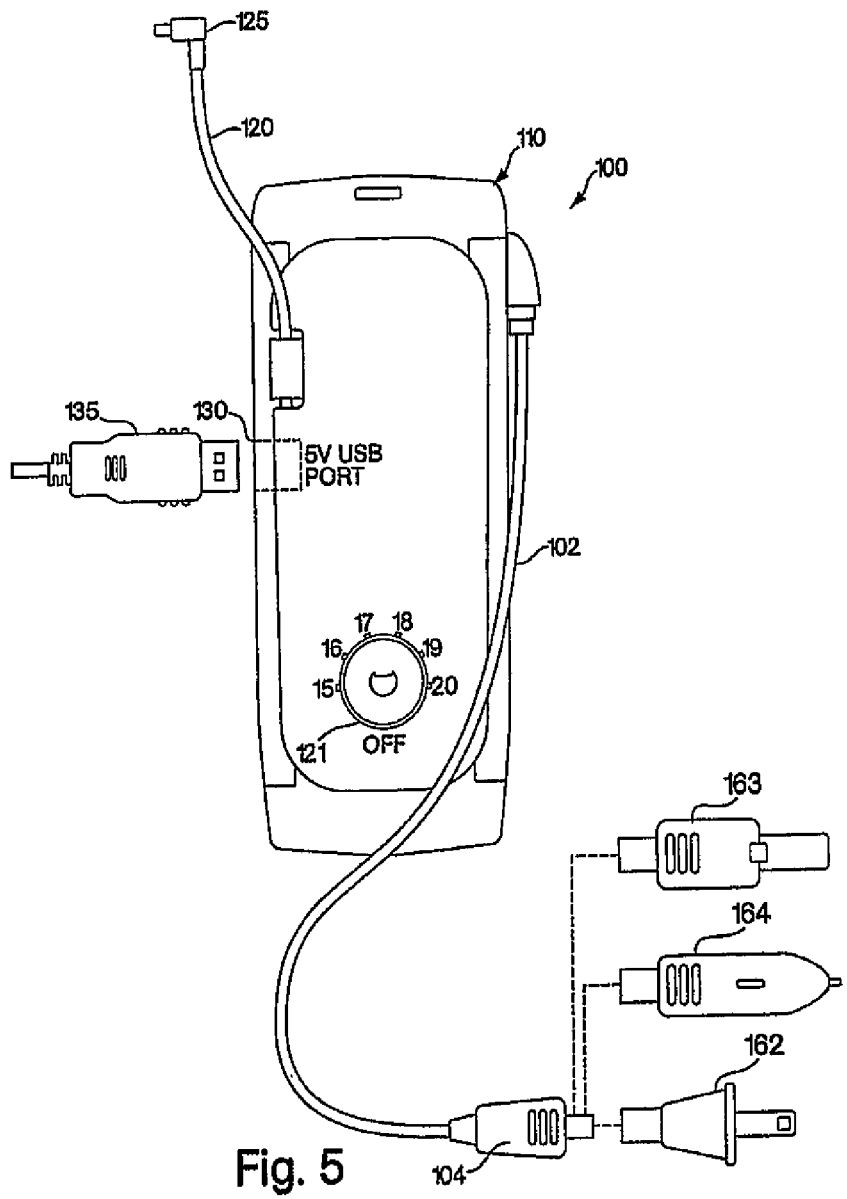
Figure 6:
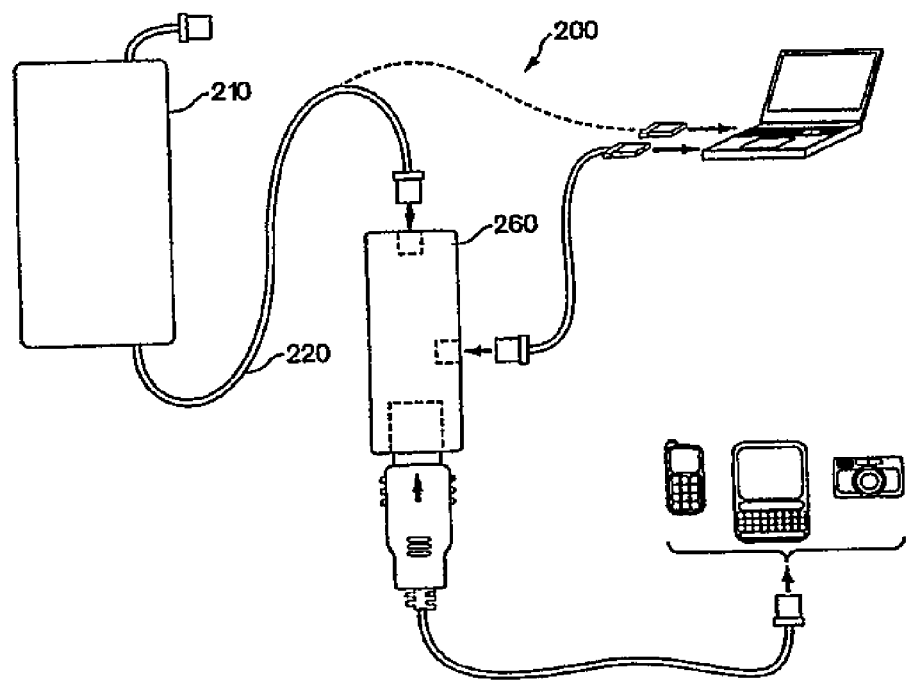
Figure 7:
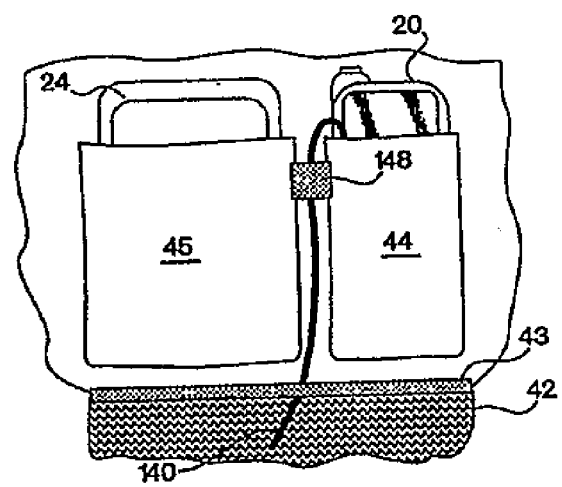

As illustrated in FIG. 3, the splitter 135 and device wires 140, 150 can be disposed and retained in a pocket 42 of the carrying case. In a preferred embodiment, the pocket 42 is formed of a mesh material and includes a loop and hook closure 43 along a top edge. The loop and hook closure 43 retains the wires 135, 140, 150 in their respective positions for easy accessibility in the carry case. Releasable loops 147, 157 may be used to retain the device wires adjacent to the pockets for the devices. A second embodiment for retaining the wires in the carry case is illustrated in FIG. 7. An elastic loop 148 is disposed between two pockets 44, 45 of the carry case. The wire 140 passes through the elastic loop 148 and is retained in position. The first voltage output 120 may be arranged to pass through an opening 127 in a wall of the carrying case to the compartment for the portable computer 12. Alternatively, the first voltage output 120 may be directly connected to the portable computer if the computer is retained in the same compartment of the carry bag. Similarly, the device wires 135, 140, 150 may pass through openings to other compartments of the carry case depending upon the location of the power adapter 110 and the devices. Additionally, the power supply cord 102 may be disposed in a pocket or compartment 46 of the carrying case. The compartment for the power supply cord 102 may be opened to the exterior of the carrying case so that the power supply cord may be attached to a power source while the carrying case remains closed.

In an embodiment of the present invention, the power supply cord 102 includes a plurality of power connectors 161–164. The power connectors 161-164 allow the power supply system 100 of the invention to be used with different power sources. For example, different connectors could be used for utility power in the United States (162), international utility power (161), airplane equipment power (163) or automobile power (164).

In certain embodiments, the power supply system 100 also includes an optional battery 170. The battery 170 may be connected directly to the input 104 of the power supply cord 102. Alternatively, another power connector could be used for connection to the battery 170. In order to charge the battery 170, the first voltage output 120 can be connected to an input 172 of the battery 170. In these embodiments, the power supply system 100 is configured to provide power to the electronic devices from the battery 170 when the power supply system 100 is disconnected from the other power sources. This configuration allows the portable computer and or the other electronic devices connected to power supply system 100 to run off the battery 170, thereby keeping the batteries in these devices ready for extended use, which diminishes the need to carry additional or backup batteries. Furthermore, the battery 170 can provide power without having to shut down or turn off the computer or other device, as is required for changing to extra batteries. Other configurations are contemplated, whereby additional battery power is added to the power supply system 100. The present invention is not limited to the battery 170 as a portable power source. A fuel cell, zinc air, or other DC power source could be attached to the power adapter to provide additional power for the electronic devices.

The circuitry in the power adapter 110 necessary to fulfill its functions will be readily identifiable to one of ordinary skill in the art. An input to the power adapter 110 must accommodate different power inputs. Thus, the circuitry determines the type and level of the voltage and activates one or more AC/DC converters or DC/DC converters. The selector switch 121 selects a DC/DC converter for providing the proper voltage level at the first voltage output 120. Another DC/DC converter is used to provide the 5 volt output for the second voltage output. Of course a single DC/DC converter which provides multiple voltage outputs can be used instead of the two DC/DC converters. Other circuitry may be included in the power adapter 110 to monitor operation and to provide signals relating to such operation.

Figure 6:
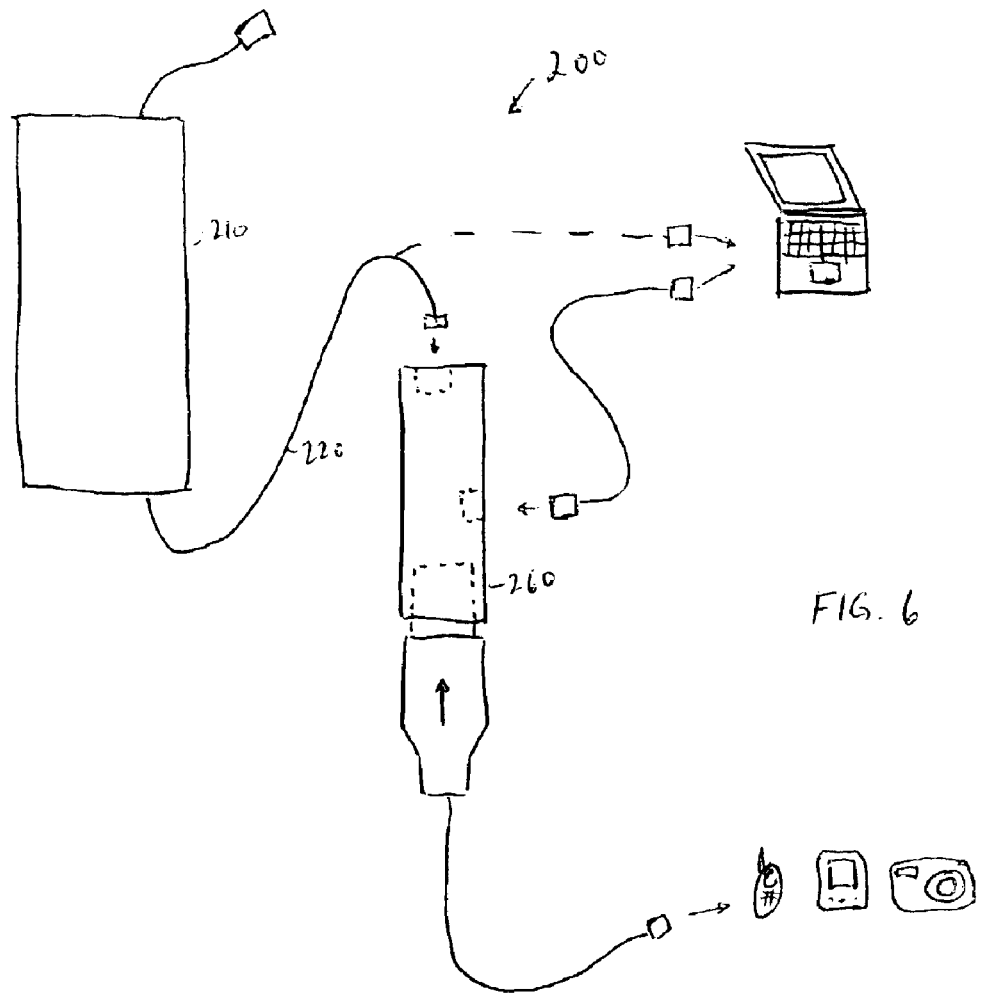
FIG. 6 is a front view of a second embodiment of a power supply system in accordance with the present invention.

FIG. 6 illustrates a second embodiment of the power supply system 200 of the present invention. In the second embodiment, the first voltage output 220 of the power adapter 210 is connected to a power distributor 260. The power distributor 260 provides multiple output ports. The power distributor may include multiple DC/DC converters for providing voltages at different levels. Various device wires are used to connect electronic devices to the power distributor 260. In the first embodiment, the power adapter 110 has two voltage outputs 120, 130. In order to accommodate multiple electronic equipment with different voltage requirements, a power distributor 260 is used to create multiple voltage levels. Also, in the first embodiment, the 5 volt USB port 130 can be used to power two devices using the splitter 135. The power distributor 260 can have multiple ports to accommodate powering of more than two additional devices. Furthermore, cords connected to the power distributor 260 can have integrated DC/DC converters for creating any desired voltage level.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A carrying case for powering and or charging multiple electronic devices from a single power source, the carrying case comprising:
    a housing providing a plurality of compartments for holding the multiple electronic devices; and
    a power supply system, the power supply system including:
        a power input system that receives power from a power source;
        a first DC voltage output configured to provide power to at least one electronic device;
        a second DC voltage output configured to provide power to at least a second electronic device;
        voltage circuitry coupled to the power input system and to the first DC voltage output and configured to provide multiple DC voltages; and
        a selector coupled to the voltage circuitry and configured to select which of the multiple DC voltages to provide to the first DC voltage output.

2. The carrying case of claim 1, wherein the power input system further includes an AC/DC converter and a power cord for operatively connecting the AC/DC converter to an AC power source.

3. The carrying case of claim 1, wherein the power input system further includes a DC/DC converter and a power cord for operatively connecting the DC/DC converter to a DC power source.

4. The carrying case of claim 1, wherein the power input system further includes an AC/DC converter; a DC/DC converter; and a power cord for selectively connecting either the AC/DC converter to an AC power source and the DC/DC converter to a DC power source.

5. The carrying case of claim 4, wherein the power cord further includes an adapter for operatively connecting a first end of the power cord to one of an AC and a DC power source.

6. The carrying case of claim 1, wherein the voltage circuitry comprises a variable DC/DC converter connected to the first DC voltage output to provide a voltage.

7. The carrying case of claim 1, wherein the second DC voltage output is a port compatible with the universal serial bus standard.

8. The carrying case of claim 1, further comprising:
    wires connecting the second DC voltage output to the second at least one electronic device; and
    a wire retainer for holding the wires.

9. The carrying case of claim 8, wherein the wires include:
    a splitter having in input connected to the second DC voltage output and at least two outputs; and
    a plurality of device wires, each device wire connecting an output of the splitter to a respective electronic device.

10. The carrying case of claim 8, wherein the wire retainer includes a mesh pocket with a loop and hook closure.

11. The carrying case of claim 1, further comprising:
    a battery module, the battery module being selectively connected to the power input system to provide power to the power system and to the first DC voltage output to charge the battery.

12. The carry case of claim 1, further comprising:
    a voltage distributor having an input connected to the second DC voltage output and a plurality of DC voltage outputs connected to a plurality of electronic devices.

13. A power adapter comprising:
    a power input system that receives power from a power source;
    a first DC voltage output configured to provide power to at least one electronic device;
    a second DC voltage output configured to provide power to at least a second electronic device;
    voltage circuitry coupled to the power input system and to the first DC voltage output and configured to provide multiple DC voltages; and
    a selector coupled to the voltage circuitry and configured to select which of the multiple DC voltages to provide to the first DC voltage output.

14. The power adapter of claim 13, wherein the power input system further includes an AC/DC converter; a DC/DC converter; and a power cord for selectively connecting either the AC/DC converter to an AC power source and the DC/DC converter to a DC power source.

15. The power adapter of claim 14, wherein the power cord further includes an adapter for operatively connecting a first end of the power cord to one of an AC and DC power source.

16. The power adapter of claim 13 wherein the voltage circuitry comprises a variable DC/DC converter connected to the first DC voltage output to provide a voltage.

17. The power adapter of claim 13, wherein the first DC voltage output includes an replaceable adapter for connecting the first DC voltage output to a specific electronic device.

18. A method for operating a power supply system to supply power to a plurality of electronic devices, the method comprising:
    selectively connecting an input of the power supply system to one of a plurality of power sources through a selectable power cord by attaching to the power cord a selected one of multiple adapters usable with the power cord and connecting the selected adapter to the one of the plurality of power sources;
    converting the power from the one of the plurality of power sources to a plurality of DC output voltages at a plurality of outputs; and connecting a plurality of electronic devices to the plurality of outputs.

19. The method of claim 18, further comprising selecting a voltage level for at least one of the DC output voltages.

20. The carrying case of claim 1 wherein the housing includes a wall dividing first and second ones of the compartments, the first compartment being sized to receive a portable computer, the wall providing a passage through the wall sized to allow passage therethrough of a power cable and connector configured for connection to the portable computer.

21. A carrying case system for powering and or charging multiple electronic devices from a single power source, the carrying case system comprising:

a housing providing a plurality of compartments for holding the multiple electronic devices;

a power supply system, the power supply system including:

a power input system that receives power from a power source;

a first DC voltage output configured to provide power to at least one electronic device, the first DC voltage output includes a wire connected to a connector;

a second DC voltage output configured to provide power to at least a second electronic device; and a plurality of differently-configured replaceable adapters configured to be connected to the connector of the first DC voltage output and to different electronic device.

* * * * *

UNITED STATES PATENT AND TRADEMARK OFFICE
CERTIFICATE OF CORRECTION

| | | |
|---|---|---|
| PATENT NO. | : 6,894,457 B2 | Page 1 of 5 |
| APPLICATION NO. | : 10/285822 | |
| DATED | : May 17, 2005 | |
| INVENTOR(S) | : Germagian et al. | |

It is certified that error appears in the above-identified patent and that said Letters Patent is hereby corrected as shown below:

Figures 1-7 are informal drawings. Please correct Figures 1-7 by replacing with the attached formal drawings, Figures 1-7.

Signed and Sealed this

Second Day of January, 2007

JON W. DUDAS
*Director of the United States Patent and Trademark Office*

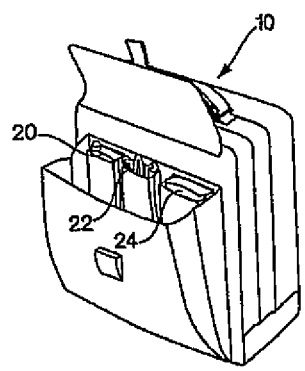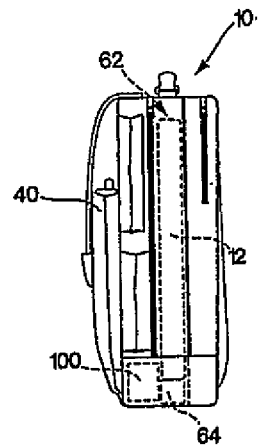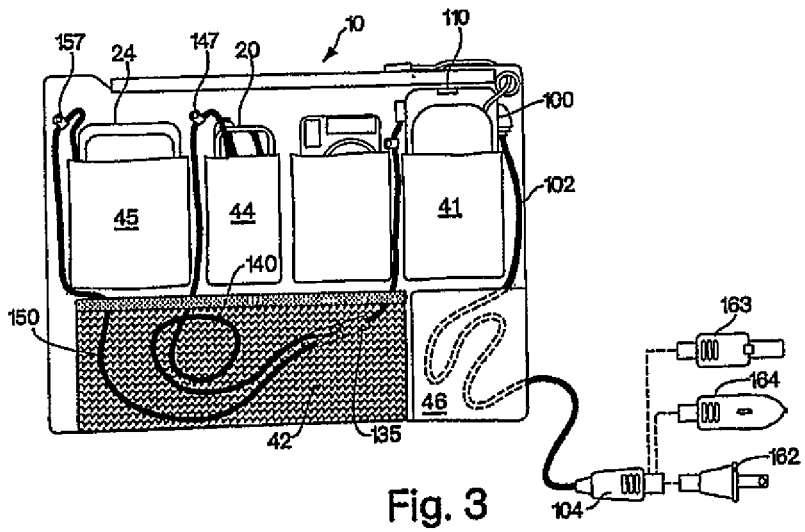
Fig. 1
Fig. 2
Fig. 3